Nov. 10, 1959 G. H. FARNSWORTH 2,912,603

BUS BAR JOINING MEANS FOR LOW IMPEDANCE BUS DUCT

Filed May 13, 1957 5 Sheets-Sheet 1

INVENTOR.
GEORGE H. FARNSWORTH

BY Ostrolenk, Faber, Gerb & Soffen

ATTORNEYS

Nov. 10, 1959 G. H. FARNSWORTH 2,912,603

BUS BAR JOINING MEANS FOR LOW IMPEDANCE BUS DUCT

Filed May 13, 1957 5 Sheets-Sheet 2

INVENTOR.
GEORGE H. FARNSWORTH
BY Ostrolenk, Faber, Gerb & Soffen
ATTORNEYS

BUS BAR JOINING MEANS FOR LOW IMPEDANCE BUS DUCT

Filed May 13, 1957

INVENTOR.
GEORGE H. FARNSWORTH
BY Ostrolenk, Faber, Gerb & Soffen
ATTORNEYS

Nov. 10, 1959 G. H. FARNSWORTH 2,912,603

BUS BAR JOINING MEANS FOR LOW IMPEDANCE BUS DUCT

Filed May 13, 1957 5 Sheets-Sheet 4

INVENTOR
GEORGE H. FARNSWORTH

BY Ostrolenk, Faber, Gerb & Soffen
ATTORNEYS

Nov. 10, 1959 G. H. FARNSWORTH 2,912,603

BUS BAR JOINING MEANS FOR LOW IMPEDANCE BUS DUCT

Filed May 13, 1957 5 Sheets-Sheet 5

INVENTOR.
GEORGE H. FARNSWORTH

BY Ostrolenk, Faber, Gerb & Soffen

ATTORNEYS

United States Patent Office 2,912,603

Patented Nov. 10, 1959

2,912,603

BUS BAR JOINING MEANS FOR LOW IMPEDANCE BUS DUCT

George H. Farnsworth, Detroit, Mich., assignor, by mesne assignments, to I-T-E Circuit Breaker Company, Philadelphia, Pa., a corporation of Pennsylvania Application May 13, 1957, Serial No. 658,773

15 Claims. (Cl. 307—147)

My invention relates to a means for joining bus duct units of the low reactance type and more specifically to a bus bar joining means which will electrically connect buses of the same phase within an individual bus duct unit so as to assure substantial equal current distribution therebetween as well as joining associated bus bars of bus duct units forming a complete bus duct system.

A bus bar arrangement for a multiphase electrical distribution system has been shown in U.S. Patent 2,287,502 to A. A. Togesen et al. wherein a pair of conductors are provided for each phase and each bus or conductor is then placed in a closely spaced relationship with respect to a bus which, because of the geometrical arrangement of the buses, carries a current which is displaced in phase by substantially 180° with respect to the first bus current.

When bus duct units constructed in accordance with this principle are so designed as to have a ladder type arrangement wherein one bus is positioned on top of another, it is necessary that the ends of the individual bus units be so adapted as to provide easy connection to the next unit and it is similarly desirable that this connection be made from either side of the ladder type arrangement since one side may always be inaccessible due to a wall or ceiling type of mounting.

It is similarly desirable that the pair of conductors corresponding to a particular phase be interconnected within each bus duct unit so as to assist an equal current distribution between the conductors of this pair as has been shown in copending application Ser. No. 630,154 filed December 24, 1956, and assigned to the assignee of the instant invention.

My novel invention proposes the utilization of a unitary connecting means which is so constructed as to connect the end of the buses of a first bus duct unit to the associated ends of the buses of a second bus duct unit and at the same time provide a connecting means for connecting the buses of a common phase at this junction. If desired, this connecting means may take the form of a U-shaped jumper which could be made of copper and provided with open end slots which are adapted to engage protruding members such as a nut and bolt arrangement on the ends of each of the bases to be fastened.

Hence one end of the jumper will engage each of the buses of a common phase of a first bus duct unit while the other end of the jumper will engage an associated pair of conductors of a second bus duct unit.

In another embodiment of my novel invention, the connecting means for the two central pairs of bus conductors could comprise flat metal straps which are insertible between their respective conductors and fastenable thereto by any desired means such as the above described nut and bolt arrangement. This flat strap-type jumper is, in many applications, to be desired over the above described U-shaped member, first from the point of economy, and secondly since it is in many instances easier to insert. A U-shaped jumper, however, is necessary, even though the central conductors are joined by flat jumpers, to connect the outer buses of the ladder arrangement.

I have found it desirable when inserting the U-shaped type of jumper to provide a flared guide means which is comprised of a strap member having upwardly flared portions, which is positioned between the bus bar and the bolt head of the bolt which is to fasten the jumper to the bus bar to facilitate the positioning of the jumper. By so providing this novel flared guide means the U-shaped jumper may be easily inserted without having to hold the bolt in a position to allow insertion of the jumper since the flared guide member will cam the bolt upwardly as the U-shaped jumper is inserted.

Accordingly, a primary object of my invention is to provide a joining means for the buses of a first and second bus duct unit which at the same time interconnects buses of a common phase within each of the individual bus duct units.

Another object of my invention is to provide a conducting jumper having open end slots which will allow interconnection between buses of a common phase which are mounted within a first and second bus duct unit and is so constructed as to be connected from either side of a ladder type bus arrangement.

Accordingly, another object of my invention is to provide a flat conducting jumper having open end slots which will allow interconnection between buses of a common phase.

A further object of my invention is to provide a U-shaped conducting jumper for interconnecting centrally located buses of a common phase of a bus duct unit.

Another object of my invention is to provide flat conducting jumper members which are insertible between bus conductors of a common phase whereby each of the bus conductors at a common phase may be electrically connected at the end of each bus duct unit.

Another object of my invention is to provide a flared guide member which is positioned between a bus conductor surface and a connecting bolt whereby a conducting jumper member is insertible between the flared guide member and the bus and automatically cams up the bolt member and positions the bolt head prior to fastening of the bolt.

It is often desirable in installations of bus duct units of the type described herein to provide means whereby adjacent bus duct units may be electrically isolated from one another. This isolating feature is most desirable whenever a run of bus ducts is energized from two or more sources. On some distribution systems, for example, the bus duct run is split near the center of the electrical load where the isolating barrier is installed, this single barrier separating one electrical service from the other. Thus, if one service becomes inoperative, the other service may be connected by first removing the isolating barrier and then tying together the bus bars of like phases with the usual connecting means for connecting the bus bars.

In essence, my novel isolating means is comprised of a single barrier having a cross-sectional area which is slightly less than the cross-sectional area of the bus duct housing. This single isolating member is then positioned in butting relationship with respect to the ends of the bus bars of adjacent bus duct units, and each of the bus bars of the individual units are tied together by jumper means of the above described type having only one-half the length, since they will not now span over the ends of their respective bus bars to interconnect with the bus bars in an adjacent bus duct unit.

Thus, the adjacent bus duct unit may have its bus bars brought adjacent the other side of the insulating barrier, and the two bus ducts may be mechanically fastened together in the normal manner although their bus bars are electrically isolated from one another.

It is to be noted that this novel bus duct insulating joint may have as little as ⅛ of an inch of space between adjacent bus bars and provides a simple and reliable method of isolating bus duct sections. This has not been possible in the prior type of bus duct arrangements since it has been necessary for adjacent bus bars to overlap one another in connecting adjacent bus bars together. Therefore, in order to isolate the bus bars from one another a plurality of barriers have been required, and it has been necessary to modify the mechanical connection between adjacent bus units. Since, however, in the instant invention, adjacent bus bars are positioned in line with one another and are interconnected by my novel jumper means, it is possible to use my simple, flat insulating member which is positioned perpendicular to the ends of the bus bars and is interposed between adjacent bus bar ends of adjacent bus duct units.

Accordingly, a still further object of my invention is to provide a novel isolating means for isolating bus bars of adjacent bus duct units.

Another object of my invention is to utilize a flat insulating member having the ends of the conductors of a first bus duct unit abutting its first surface, and the ends of the conductors of a second bus duct unit abutting its second surface.

Another object of my invention is to utilize a flat insulating member for isolating adjoining bus duct units wherein corresponding conductors are positioned in alignment with one another and are connectible by jumper means.

A further object of my invention is to provide barrier means for electrically isolating bus bars of adjacent bus duct units while still permitting the usual mechanical connection between the units without any physical alteration of the units.

These and other objects of my invention will become apparent from the following description when taken in connection with the drawings in which.

Figure 1:
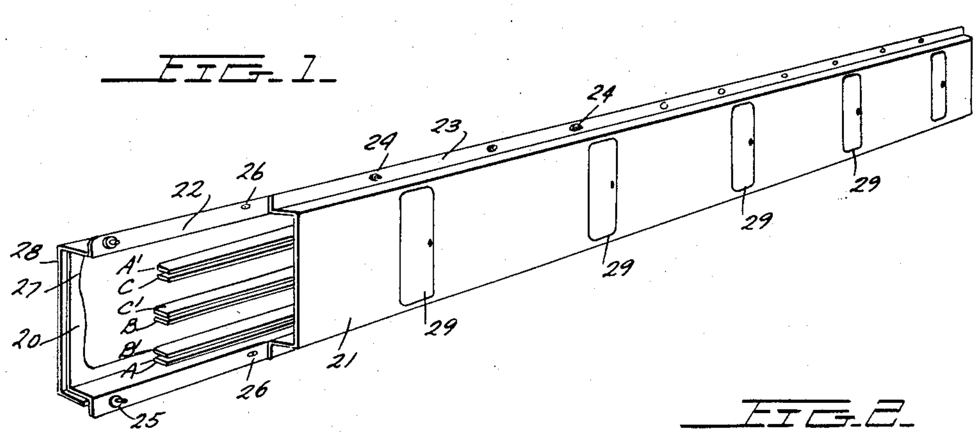
Figure 1 shows a perspective view of a ladder type bus arrangement which may be connected to a similar type bus duct unit by the connecting means of my novel invention.

Referring now to Figure 1, it is seen that a single bus duct unit is comprised of a network of six bus bars, A, A′, B, B′, C and C′ wherein bus bars A and A′, B and B′ and C and C′ are energized from a first, second and third phase respectively. However, in accordance with U.S. Patent 2,287,502 described above, bus bars A′ and C, C′ and B, and B′ and A of the example set forth herein are constructed so as to be in a close spaced relationship with one another so as to offer a very low reactance system.

The above noted bus bars of Figure 1 may be supported in any desired manner from the bus duct housing which is comprised of duct halves 20 and 21. These halves are seen to have flanged ends 22 and 23 respectively which flanges allow a connection between the two duct halves 20 and 21 by means of the bolt arrangement such as the bolts 24 which interconnect the flanges 22 and 23. It is further seen that the duct halves 20 and 21 are so positioned with respect to one another as to provide a scarf lap joint upon connection to another bus duct unit which is constructed in an identical manner.

Hence, by placing the scarf lap joint of the second bus unit so as to be connected by bolts 25 and a bolt which will protrude through the openings 26, a high strength joint will be achieved. So as to allow access to the bus bar within the housing formed by the duct halves 20 and 21, an opening such as opening 27 in duct half 20 is provided and a similar opening may be provided in the bus duct unit which is attached to the unit of Figure 1.

A cover such as the cover 28 may then be provided in such a manner as to be removably engaged with the bus duct half 20 so as to cover the aperture 27 when access to the bus ends is not required.

Electrical connection or tap off may then be had through holes in the bus duct such as the holes 29 in bus duct half 21 which are exposable so as to provide connecting access to the buses contained within the bus duct housing.

Figure 2:
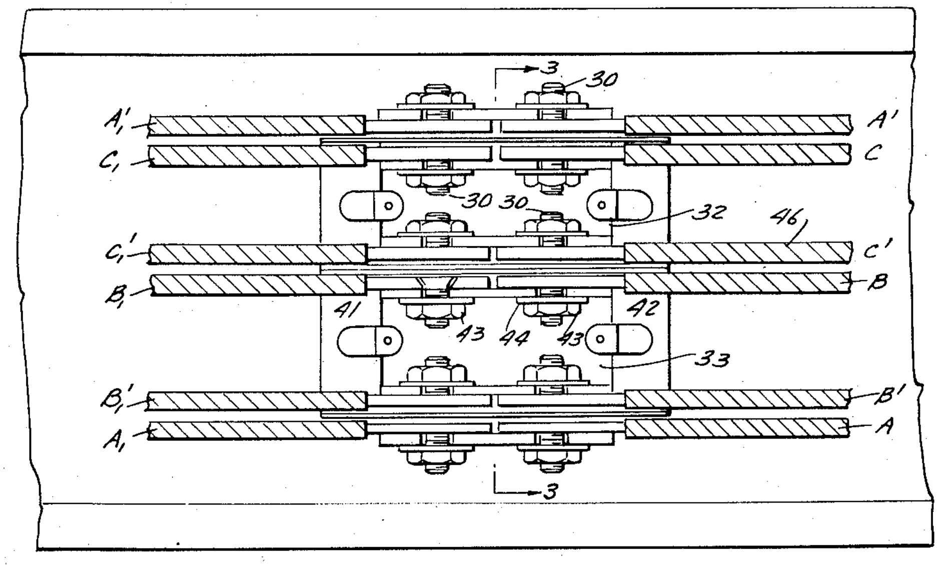
Figure 2 shows a side view of the ends of two bus duct units of the type shown in Figure 1 when adapted with the copper jumpers of my novel invention.

Figure 2 shows the buses A, B, C, and A′, B′ and C′ of the bus duct unit of Figure 1 as being positioned to be connected with the associated buses $A_1$, $B_1$, $C_1$, $A_1'$, $B_1'$ and $C_1'$ of a second bus duct unit. Each of the bus bars of the first and second unit have a stud such as the stud 30 of bus bar A′ protruding therefrom and constructed to be integral with the bus. Hence, as may be more specifically seen in Figure 4, the bus bar B has a stud 30 inserted within an aperture 31 and fastened therein by any desired means such as welding.

As has been stated above, it is desired that the buses A′, C, C′, B, B′ and A and $A_1'$, $C_1$, $C_1'$, $B_1$, $B_1'$ and $A_1$ respectively be fastened together so as to provide continuity of the bus run system as well as to interconnect the pair of buses corresponding to each phase so as to assure an equal current distribution therebetween. That is to say, it is desired to electrically connect buses A and A′, C and C′, and so on and it is desired that this connection be made for each bus unit and by the same means that interconnects the buses of the first and second unit. This connection is provided by means of the copper jumpers 32, 33 and 34 of Figures 2 and 3 where jumper 32 interconnects all of the buses of phase C, jumper 33 interconnects all the buses of phase B, and jumper 34 interconnects all the buses of phase A.

Figure 5:
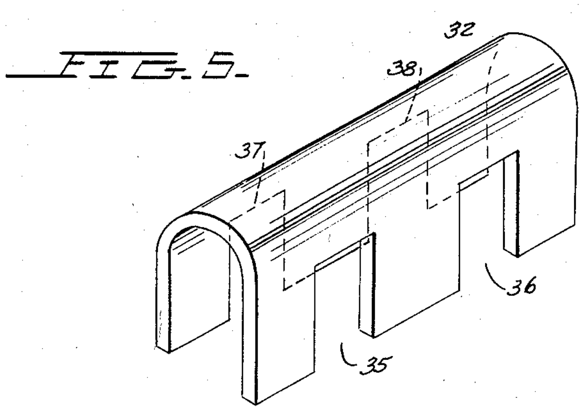
Figure 5 shows a perspective view of the U-shaped copper jumper of Figures 2 and 3.

The construction of the jumpers 32, 33 and 34 is exemplified by the perspective view of Figure 5 which shows jumper 32 as being comprised of a sheet of U-shaped conducting material having the open end slots 35, 36, 37 and 38.

Figure 3:
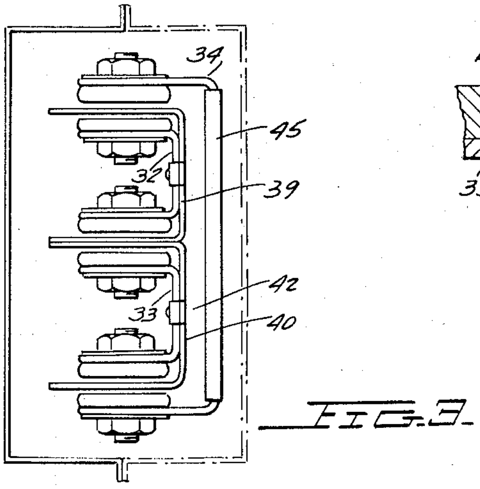
Figure 3 shows a view of Figure 2 when taken across the lines 3—3.

Jumpers 32 and 33 of Figure 2 and Figure 3 are further seen to have sheets of insulating material 39 and 40 secured thereto in any desired manner such as the rivet and bracket means 41 and 42 associated with jumper 33.

In the assembly of the copper jumpers and their associated bus bars, it may be seen in conjunction with Figures 2 and 3 that the copper jumper 32 is constructed so as to have open end slots 35 through 38 come into cooperating engagement with respect to the protruding bolts 30 of buses C, C′, $C_1$ and $C_1'$ whereupon nuts 43 which cooperate with bolts 30 secure jumper 32 to its associated bus bars through the cup type washers 44.

It is to be noted that nut 43 may be of the captive type with respect to its bolt 30 by peening the end of the bolt 30 so as to defeat removal of nut 43.

In a similar manner the jumper 33 may be fastened to bus bars B, B′, $B_1$ and $B_1'$, copper jumper 33 being identical in construction to the jumper 32. In order to provide connection between the buses of the A phase, the elongated copper jumper 34 is provided having an insulating tape 45 wound thereon, the copper jumper 34 having the same type open end slots as shown in Figure 5 for the jumper 32 which cooperate with studs 30 of buses A′, A, $A_1'$ and $A_1$.

It is to be noted that jumpers 32, 33 and 34 not only interconnect each of the four buses of their corresponding phases but further serve by virtue of the spacing between their open end slots, to longitudinally position the buses of the first and second bus duct units with respect to one another.

Furthermore, the insulating spacers 39 and 40 which are attached to jumpers 32 and 33 are so provided as to extend between adjacent buses of a different phase relationship since at the point of connection of the jumpers, the insulating tape such as the tape 46 has been removed from the buses.

Similarly, the insulation spacers 39 and 40 serve to insulate copper jumpers 32 and 33 from the copper jumper 34 which is also insulated by the tape 45.

Figure 4:
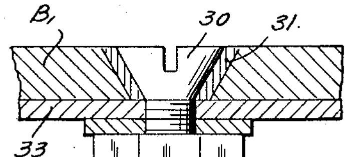
Figure 4 shows a fragmentary view of the manner in which the bolt of Figures 2 and 3 is fastened to the bus bar.
Figure 6:
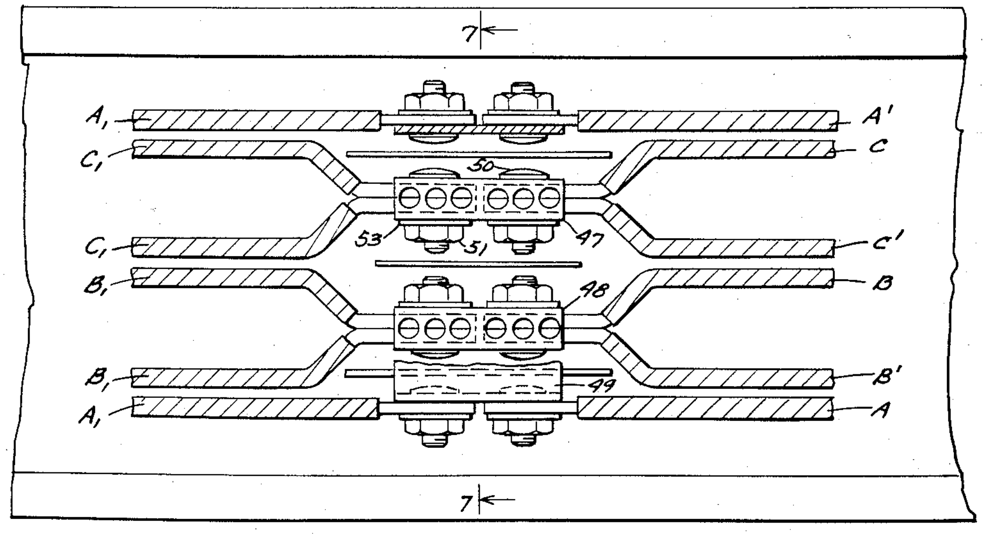
Figure 6 shows a side view similar to Figure 2 wherein the bus bars have been offset so that adjacent buses of a similar phase are directly fastened to one another by a copper jumper.
Figure 7:
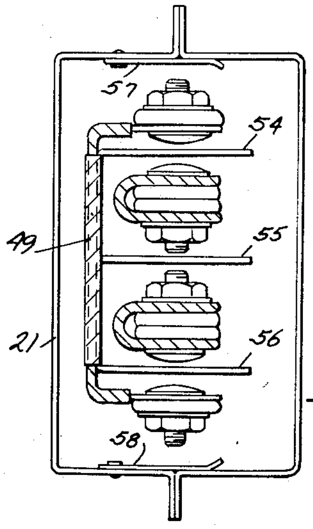
Figure 7 is a view of Figure 6 when taken across the line 7—7.

A second embodiment of my novel invention may be seen in conjunction with Figures 6 and 7 in which adjacent buses of the same phase have been offset from one another so as to allow a substantial decrease in the size of the required jumper, and to also eliminate the requirement of a bolt such as the bolt of Figures 2 and 4.

Figure 8:
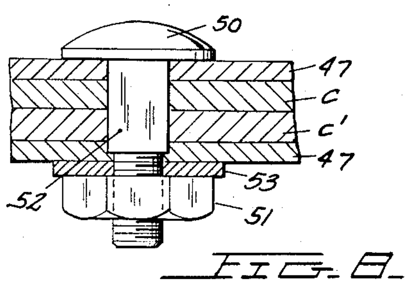
Figure 8 shows a side view of the bolt utilized in the embodiment of Figures 6 and 7.

In the case of Figures 6 and 7, the copper jumpers 47, 48 and 49 are associated with phases C, B and A respectively wherein a stud or bolt 50 extends through aligned holes in the buses and is terminated by a nut 51 which may be of the captive type. Bolt 50 may be further seen in conjunction with Figure 8 and it is seen that this bolt is provided with a rectangular shoulder 52 which rectangular shoulder is dimensioned so as to receive an open end slot of the jumper associated therewith.

Hence jumpers 47, 48 and 49 which are constructed in accordance with the jumper of Figure 5 serve the function of maintaining the bolt 50 in a fixed angular position when the nut 51 is tightened against a cup washer 53.

Here again insulation is provided between the point of connection for the buses of different phases by virtue of the insulating spacers 54, 55 and 56 which are attached in any desired manner to jumper 49 as is specifically seen in Figure 7. A further insulating means 57 and 58 may be fastened to the duct housing 21 so as to increase the distance through air between line members mounted interiorly of the duct housing and the duct housing itself.

Thus in the case of Figures 6 and 7, it is seen that jumper 47 serves to connect buses C, C′, $C_1$ and $C_1'$ while jumper 48 connects buses B, B′, $B_1$ and $B_1'$, and jumper 49 connects buses A, A′, $A_1'$ and $A_1$ and at the same time serves to position these buses with respect to one another in view of the fixed distance between the open end slots of the jumpers.

Hence, it is seen that in the case of Figures 6 and 7, as in the case of the embodiments of Figures 2 and 3, that the connection of a first and second bus housing may take place from either side of the ladder type bus arrangement in view of the simplicity afforded by my novel U-shaped jumper. Similarly, the single U-shaped copper jumper serves the dual function of connecting associated bus bars of a first and second unit to one another as well as interconnecting the conductors of a common phase for each bus unit so as to ensure an equal current distribution therebetween.

Figures 9, 10, 11, 12:
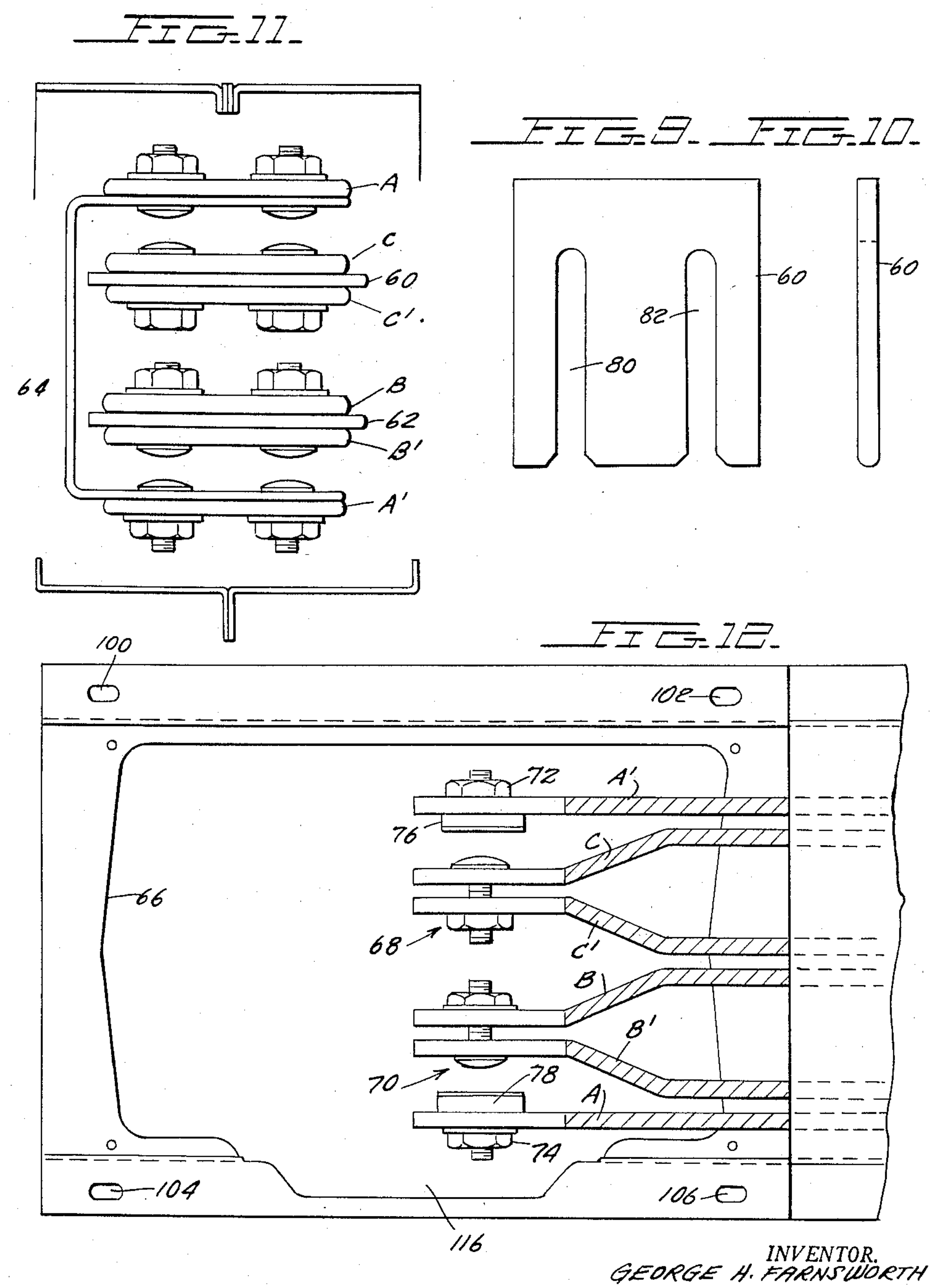
Figure 9 shows a top view of a flat member for interconnecting buses of the same phase.
Figure 10 is a side cross-sectional view of the flat connector means of Figure 9.
Figure 11 is a cross-sectional view similar to Figure 3 wherein the flat conductor member or conducting slug of Figure 9 is utilized.
Figure 12 is a side view of the right-hand end of a bus duct unit having a hand hole opening and adapted to receive conducting slug connecting members.

While Figures 2, 3, 6 and 7 have described my novel invention with reference to jumper means of the type set forth in Figure 5, or a U-shaped jumper, it is possible, and in some cases desirable, to substitute the flat conducting slug such as slug 60 of Figures 9 and 10 for the U-shaped member. In utilizing this flat conducting slug it is seen in Figure 11, which is similar to Figure 3 with the flat conducting slug substituted for the U-shaped jumper, that it is only necessary to insert conducting slugs 60 and 62 between bus bars C and C′, while slug 62 which is of identical construction as slug 60 is inserted between buses B and B′.

Clearly, however, a U-shaped copper jumper 64 is required to connect buses A and A′ in the manner hereinbefore described.

It is to be noted that these slugs 60 and 62 are easily slipped in between their corresponding bus bars, thereby eliminating the difficulty of threading the U-shaped jumpers under the heads and nuts of the bus bar joining bolts. Furthermore, the copper slugs may be installed from either side.

Prior to interconnection the left-hand end of a bus duct unit will look as is shown in Figure 12 wherein the duct has the hand hole opening 66 for allowing access to the nut and bolt arrangement seen generally at 68 for joining bus bars C and C′ to adjacent similar conductors in the left-hand bus unit (not shown), while bus bars B and B′ are provided with a similar nut and bolt arrangement seen generally at 70.

Clearly, bolts 72 and 74 operate to receive a U-shaped jumper such as the U-shaped jumper 64 of Figure 11, these nut and bolt arrangements being further provided with flared metal guides 76 and 78 respectively, which will be described hereinafter.

Figure 13:
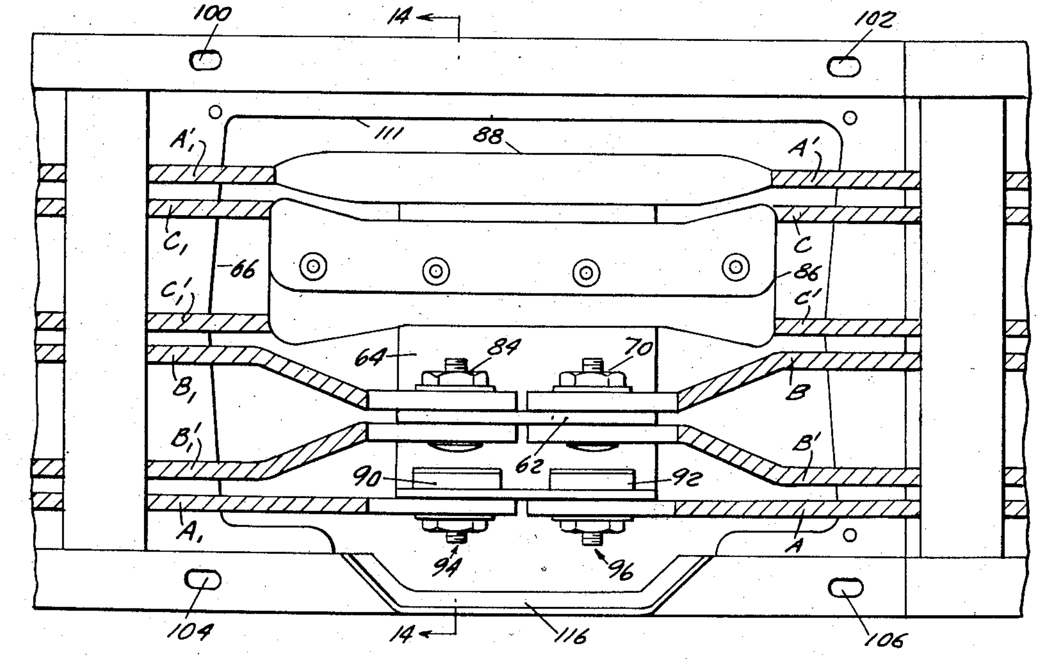
Figure 13 shows the bus duct of Figure 12 when connected to an adjacent bus duct by means of the flat conducting slug connectors.
Figure 14:
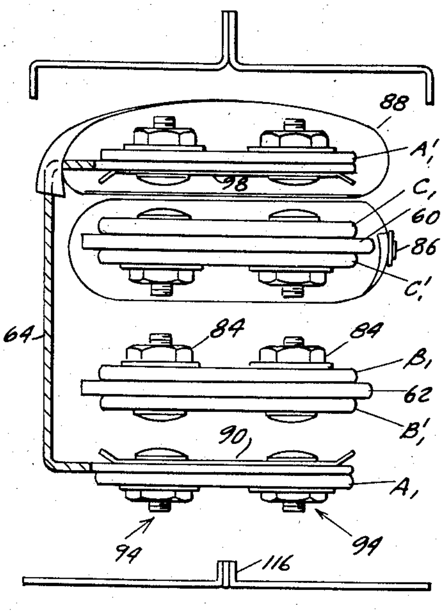
Figure 14 is a cross-sectional view of Figure 13 taken across the lines 14—14, and illustrates the use of a flared guide member for the U-shaped jumper.
Figure 15:
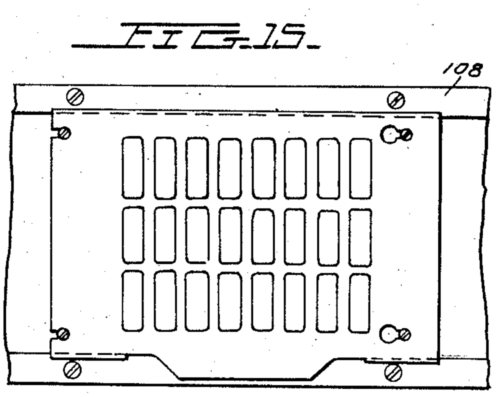
Figure 15 shows a hand hole cover for the hand hole opening of the bus duct of Figures 12 or 13.

Figures 13 and 14 show the bus duct of Figure 12 after connection to adjacent bus duct units. That is, bus bars B and B′ of the right-hand unit are connected to one another and are similarly connected to bus bars $B_1$ and $B_1'$ by means of the conducting slug 62 which has slots similar to slots 80 and 82 of Figure 9 which slip over the bolt shank of the nut and bolt means 70 and 84 respectively associated with the right-hand bus duct unit and left-hand bus duct unit respectively.

In a similar manner, the bus bars C, $C_1$, C′ and $C_1'$ are fastened together electrically and mechanically, this connection being obscured in Figure 13 by the insulating boot 86 which is snapped around the exposed conductor surfaces at the joint to insulate these surfaces from other live conducting portions.

A similar insulating boot 88 is snapped around conductor A′ and $A_1'$, these conductors being electrically connected to conductors A and $A_1$ by means of the copper jumper 64. Clearly, after all of the buses are interconnected insulating boots are snapped around the exposed portions of the joints of conductors A and A′ as well as the joint of conductors B, B′, $B_1$ and $B_1'$.

As best seen in Figures 13 and 14, flared metal guides 90 and 92 are inserted between the nut heads of nut and bolt arrangements 94 and 96 respectively. In a similar manner (see Figure 14) a flared metal guide 98 is positioned between the bolt heads of the fastening bolts for buses A′ and $A_1'$ and the buses themselves. The function of this flared metal guide is to provide a camming action for automatically lifting the bolt heads away from their respective buses as the copper jumper 64 is inserted into position for electrically connecting the various buses of phase A. Clearly, this guide action can be provided for the central bus connectors if they are to be interconnected by U-shaped jumper means.

In assembling the bus duct units of Figures 12, 13 and 14 the duct casing scarf laps are first bolted together at aligned apertures 100, 102, 104 and 106. The two copper slugs 60 and 62 (see Figure 14) are inserted between the four centrally positioned bus bars, and the cooperating bolt arrangements are tightened to assure good mechanical and electrical connection. These two central joints may then be covered with the snap-on insulating boots, such as the boot 86 shown in Figures 13 and 14, and the wide U-shaped conducting jumper 64 is forced in place between the outside bus bars of the A group and the flared guide members, such as guide members 90 and 92 of bus bars A and $A_1$. The associated nut and bolt arrangement for the U-shaped copper jumper may then be tightened, and the remaining exposed joints may be covered with two more insulating boots to thereby completely isolate all of the exposed conducting material from any other live portion of the bus duct housing.

A hand hole cover such as the hand hole cover 108 may then be brought into position to close hand hole opening 111 of the left-hand bus duct unit, and a similar hand hole cover may be connected to cover aperture 66 (see Figure 12) of the right-hand bus duct unit.

Figure 16:
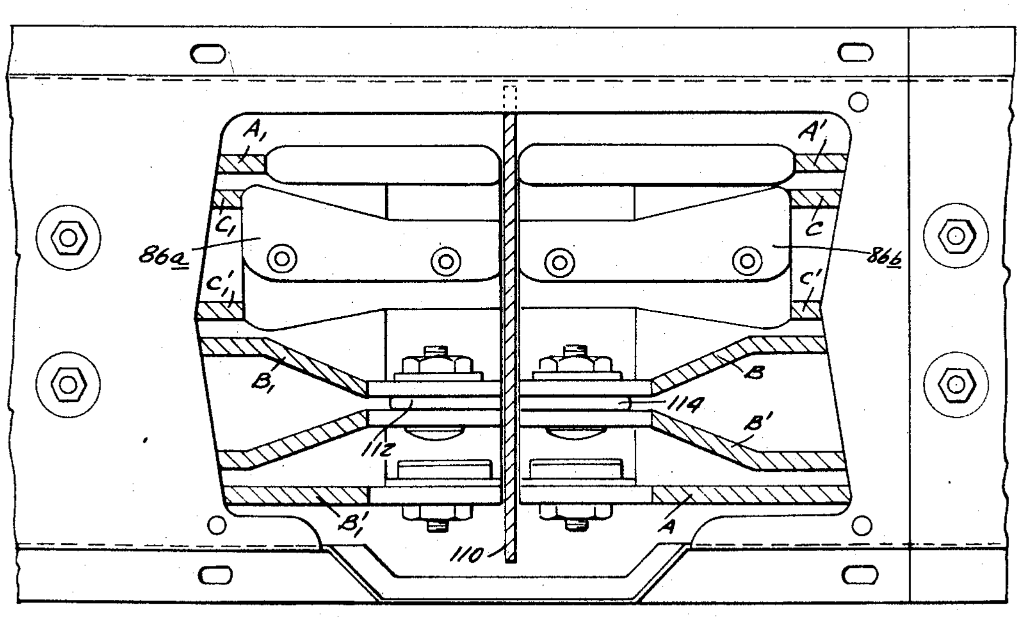
Figure 16 shows two adjacent bus duct units which are mechanically connected to one another but are electrically insulated from one another by my novel flat insulating member.
Figure 17:
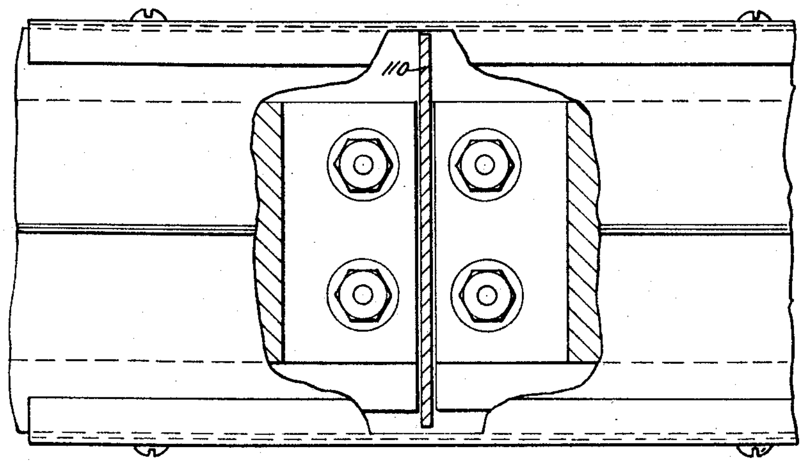
Figure 17 is a top view of Figure 16.
Figure 18:
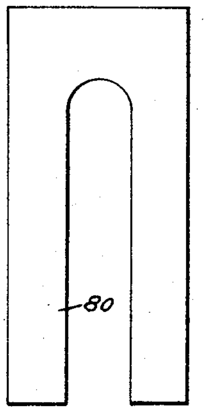
Figure 18 is a top view of the conducting slug member for interconnecting buses of similar phases in the embodiment of Figures 16 and 17.

Figures 16 and 17 which utilize connecting slugs of the type shown in Figure 18 set forth the manner in which two bus duct units may be electrically isolated from one another.

The isolation of the conductors of adjacent bus duct units is appreciably simplified in view of the alignment between similar buses of adjacent units, rather than the over-lapping relationship heretofore required in connecting bus duct units to one another. Thus, as may be seen in Figures 16 and 17, it is only necessary to insert a simple insulating barrier 110 between the ends of the buses of the adjacent bus duct units with the bus ends abutting against or being slightly spaced from the surface of the insulating barrier 110.

In order to maintain an interconnection for both mechanical and electrical reasons between buses of a common phase within each individual right and left-hand bus duct units, conducting slugs such as the slugs 112 and 114 which are constructed as shown in Figure 18 to have only a single slot, interconnect buses $B_1$, $B_1'$ and B, B′ respectively. In a similar manner two half-slugs will interconnect bus bars $C_1$ and $C_1'$ and bus bars C and C′ respectively, these buses being enclosed by the boots **86*a* and 86*b*** respectively in Figure 16.

The buses $A_1$ and $A_1'$ will be connected by a copper jumper having half the width of a copper jumper utilized in the embodiment of Figure 13, while a similar copper jumper will interconnect the bus bars A and A′ of the right-hand bus duct unit.

Thus, it is seen that the isolated joint is mechanically made in a manner which is substantially identical to that of each of the conductive joints throughout the bus duct system with the exception of the insulating member 110 which electrically insulates the bus conductors of adjacent units, and the use of conducting members for interconnecting buses of a similar phase which have only one-half the width of the normally used interconnecting member. It is to be clearly noted that the bus duct units are not altered in any way when they are isolated from one another and are identical to the normally used duct units.

As an added feature of my novel invention, I have found it desirable to provide a bulge in the bottom of the housing, such as the bulge 116 of Figures 12 and 13. This bulge is provided in the casing to first facilitate the tightening of nuts, and secondly to provide additional clearance through air between steel and live copper parts when the insulating boots are not utilized.

Although I have described preferred embodiments of my invention, many modifications and variations will now be evident to those skilled in the art and I prefer therefore to be limited, not by the specific disclosure herein, but only by the appended claims.

I claim:

1. In an electrical distribution system comprised of a plurality of individual bus duct units, each of said bus duct units including a pair of flat conductors, each of said flat conductors of each pair of conductors being adjacently positioned in different planes to form a ladder type arrangement, connecting means for one end of each of said bus duct units for connecting said pairs of conductors end to end to form said distribution system; said connecting means being further constructed to electrically connect each of said pair of conductors; said connecting means being connectible to said conductors from either side of said ladder type arrangement.

2. In a multiphase electrical distribution system comprised of a first and second bus duct unit, each of said first and second bus duct units including a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a U-shaped jumper for each pair of buses, each of said U-shaped jumpers being constructed to electrically connect and fasten pairs of buses of said first and second bus duct units corresponding to the same phase.

3. In a multiphase electrical distribution system comprised of a first and second bus duct unit, each of said first and second bus duct units including a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a U-shaped jumper for each pair of buses; said U-shaped jumper having open end slots therein; the end of the buses cooperating with said U-shaped copper jumper having a protruding means extending therefrom for cooperating in fastening relationship with one of said open end slots of said jumper to electrically connect and fasten pairs of buses of said first and second bus duct units corresponding to the same phase.

4. In a multiphase electrical distribution system comprised of a first and second bus duct unit, each of said first and second bus duct units including a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a U-shaped jumper for each pair of buses, said U-shaped jumper having open end slots therein, the end of the buses cooperating with said U-shaped copper jumper having a protruding means extending therefrom for cooperating in fastening relationship with one of said open end slots of said jumper to electrically connect and fasten pairs of buses of said first and second bus duct units corresponding to the same phase, adjacent buses of the same phase within said ladder type arrangement being offset towards one another at the end of their bus duct unit.

5. In a multiphase electrical distribution system comprised of a first and second bus duct unit, each of said first and second bus duct units including a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a U-shaped jumper for each pair of buses, said U-shaped jumper having open end slots therein, the end of the buses cooperating with said U-shaped copper jumper having a protruding means extending therefrom for cooperating in fastening relationship with one of said open end slots of said jumper to electrically connect and fasten pairs of buses of said first and second bus duct units corresponding to the same phase, adjacent buses of the same phase within said ladder type arrangement being offset towards one another at the end of their bus duct unit, said U-shaped jumper being further adapted to carry insulating means for insulating the ends of buses adjacent one another which are of different phase.

6. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a flat conducting member for each internally located pair of buses; said flat conducting member having open end slots therein; the end of the buses cooperating with said flat conducting member having fastening means for cooperating in fastening relationship with one of said open end slots of said flat member to electrically connect and fasten pairs of buses of said first and second bus duct units corresponding to the same phase.

7. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a flat conducting member for each internally located pair of buses, said flat conducting member having open end slots therein, the end of the buses cooperating with said flat conducting member having fastening means for cooperating in fastening relationship with one of said open end slots of said flat member to electrically connect and fasten pairs of buses of said first and second bus duct units corresponding to the same phase, adjacent buses of the same phase within said ladder type arrangement being offset towards one another at the end of their bus duct unit.

8. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a flat conducting member for each internal pair of buses and a U-shaped jumper for buses positioned on either end of said ladder type arrangement, said U-shaped jumper and said flat conducting members having open end slots therein, the end of the buses cooperating with said U-shaped jumper and flat member having fastening means for cooperating in fastening relationship with one of said open end slots of said jumper and said flat member to electrically connect and fasten pairs of buses of said first and second bus duct units corresponding to the same phase, adjacent buses of the same phase within said ladder type arrangement being offset towards one another at the end of their bus duct unit, said U-shaped jumper being further adapted to carry insulating means for insulating the ends of buses adjacent one another which are of different phase.

9. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a flat conducting member for each internal pair of buses and a U-shaped jumper for buses positioned on either end of said ladder type arrangement, said U-shaped jumper and said flat conducting members having open end slots therein, the end of the buses cooperating with said U-shaped jumper and flat member having fastening means for cooperating in fastening relationship with one of said open end slots of said jumper and said flat member to electrically connect and fasten pairs of buses of said first and second bus duct units corresponding to the same phase, adjacent buses of the same phase within said ladder type arrangement being offset towards one another at the end of their bus duct unit, said fastening means of said buses connectible by said U-shaped jumper having flanged members positioned between said fastening means and their respective bus; said flanged means receiving the ends of said U-shaped jumpers to cam said fastening means away from their respective bus when said U-shaped jumper is inserted in position.

10. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for connecting one end of the buses of said first bus duct unit to one end of the buses of said second bus duct unit, said connecting means being further constructed to electrically connect each of said pair of buses for each phase, said connecting means comprising a U-shaped jumper for each pair of buses; said U-shaped jumper having open end slots therein; the end of the buses cooperating with said U-shaped conducting jumper having a protruding means extending therefrom for cooperating in fastening relationship with one of said open end slots of said jumper to electrically connect and fasten pairs of buses of said first and second bus duct units corresponding to the same phase of said protruding fastening means of each of said buses having flanged members positioned between said fastening means and their respective bus; said flanged means receiving the ends of said U-shaped jumpers to cam said fastening means away from their respective bus when said U-shaped jumper is inserted in position.

11. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for each bus duct unit constructed to electrically connect each of said pair of buses for each phase within each respective unit; the coresponding buses of each of said first and second bus duct unit being positioned with their ends adjacent one another, and flat insulating means positioned between said ends of said buses of said bus duct units for electrically isolating said first and second bus duct units.

12. In a multiphase electrical distribution system comprised of a first and second bus duct unit, each of said first and second bus duct units comprising a pair of buses for each phase of said multiphase system, said buses being positioned on top of one another in a ladder type arrangement and in a sequence and spacing to provide a low reactance system, connecting means for each bus duct unit constructed to electrically connect each of said pair of buses for each phase within each respective unit; the corresponding buses of each of said first and second bus duct unit being positioned with their ends adjacent one another, and flat insulating means positioned between said ends of said buses of said bus duct units for electrically isolating said first and second bus duct units; said connecting means comprising a flat conducting member for each internal pair of buses and a U-shaped jumper for buses positioned on either end of said ladder type arrangement, said U-shaped jumper and said flat conducting members having an open end slot therein, the end of the buses cooperating with said U-shaped jumper and flat member having fastening means for cooperating in fastening relationship with said open end slot of said jumper and said flat member to electrically connect and fasten pairs of buses of said first and second bus duct units respectively coresponding to the same phase, adjacent buses of the same phase within said ladder type arrangement being offset towards one another at the end of their bus duct unit.

13. In an electrical distribution system comprised of a plurality of individual bus duct units, each of said bus duct units including a pair of flat conductors, each of said flat conductors of each pair of conductors being adjacently positioned in different planes to form a ladder type arrangement, connecting means for one end of each of said bus duct units for connecting said pairs of conductors end to end to form said distribution system; said connecting means being further constructed to electrically connect each of said pair of conductors.

14. A multiphase electrical distribution system; said multiphase electrical distribution system comprising a first and second bus duct unit; each of said first and second bus duct units comprising at least a pair of conductors for each phase of said multiphase electrical distribution system; a connecting means; said connecting means connecting one end of said conductors of said first bus duct unit to one end of said conductors of said second bus duct unit; said connecting means further electrically connecting each of said pair of conductors for each phase.

15. A multiphase electrical distribution system; said multiphase electrical distribution system comprising a first and second bus duct unit; each of said first and second bus duct units comprising at least a pair of conductors for each phase of said multiphase electrical distribution system; a connecting means; said connecting means connecting one end of said conductors of said first bus duct unit to one end of said conductors of said second bus duct unit; said connecting means further electrically connecting each of said pair of conductors for each phase; said connecting means being connectible to said conductors from either side of said conductors.

References Cited in the file of this patent

UNITED STATES PATENTS

| | | |
|---|---|---|
| 2,287,502 | Togesen et al. | June 23, 1952 |
| 2,786,151 | Fisher | Mar. 19, 1957 |
| 2,786,152 | Fisher | Mar. 19, 1957 |